Dec. 20, 1960  C. G. KESSELRING  2,964,784
DECAPITATOR AND TAIL CUTTING DEVICE
Filed May 22, 1959

INVENTOR.
CARL G. KESSELRING

United States Patent Office 2,964,784
Patented Dec. 20, 1960

2,964,784

DECAPITATOR AND TAIL CUTTING DEVICE

Carl G. Kesselring, Rte. 2, Council Bluffs, Iowa

Filed May 22, 1959, Ser. No. 815,203

2 Claims. (Cl. 17—12)

This invention relates to shears having a cutting blade pivotally mounted in relation to a stationary coacting cutting edge, and in particular an L-shaped base having a vertically positioned flange with a V-shaped notch therein extended upwardly from a horizontally disposed base, and a cutting blade having a handle on the end end thereof pivotally mounted on the vertically positioned flange, whereby the neck of a chicken or the tail of a lamb is readily severed by downward movement of the blade providing an inexpensive chicken decapitator or tail remover.

The purpose of this invention is to provide a chicken decapitator which is formed of comparatively few parts and is inexpensive to manufacture.

Conventional chicken decapitators have been made with numerous parts whereby the machines are difficult to clean, and owing to the machine work in the manufacture of the devices such devices are very costly. For this reason very few farmers use decapitators, although the use of such machines is very desirable.

With this thought in mind this invention contemplates a chicken decapitator having an L-shaped base with a cutting blade or knife pivotally mounted on an upstanding flange supported by the base and positioned to coact with a V-shaped notch in said flange, whereby the device includes two parts, a guard for holding the blade against the upstanding flange being integral with the base.

The object of this invention, is, therefore, to provide a chicken decapitator that includes only two major parts.

Another object of the invention is to provide a chicken decapitator having an angle iron base in which a neck receiving notch is positioned in an upstanding flange on which a cutting blade is pivotally mounted.

Another important object is to provide a chicken decapitator in which a cutting edge is integral with the cutting lever of the device.

It is yet another object of the invention to provide a handle for a chicken decapitator in which the handle is formed by a piece of pipe for more economical construction than is possible with wooden handles and the like, the pipe being particularly adapted for cooperation with the shape of the cutting lever, since the cutting lever is preferably of considerable width, being relatively thin for the utmost economy, whereby it is hard on the hand to press on the blade without a handle, and the blade also being ill-shaped for economical attachment of other types of handles.

A further object of the invention is to provide a cutting blade pivotally mounted on a vertical flange or leg of an angle iron in which a guard is provided for urging the blade against the surface of the leg, and in which the leg is provided with a notch positioned to coact with the blade.

A still further object is to provide a decapitator that is so economical that it may also be used for cutting lamb's tails.

And a still further object is to provide a chicken decapitator and lamb's tail cutter which is of a simple and economical construction.

With these and other objects and advantages in view the invention embodies an angle iron having a base with bolt holes therein, and a vertically disposed flange having a V-shaped notch therein, a blade pivotally mounted on the vertically disposed flange and having a cutting edge positioned to coact with the V-shaped notch of the flange, and a guard extended upwardly from the base and spaced from the flange for holding the blade against the flange.

Other features and advantages of the invention will appear from the following description taken in connection with the drawings, wherein.

Figure 1:
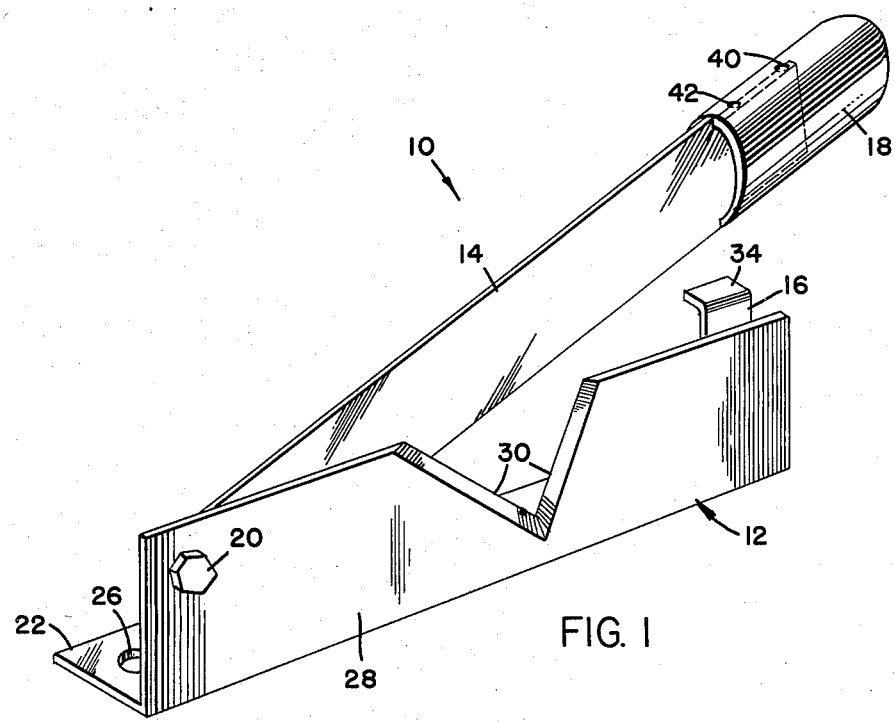
Figure 1 is a perspective view showing a decapitator and tail remover looking toward the stationary blade thereof.
Figure 2:
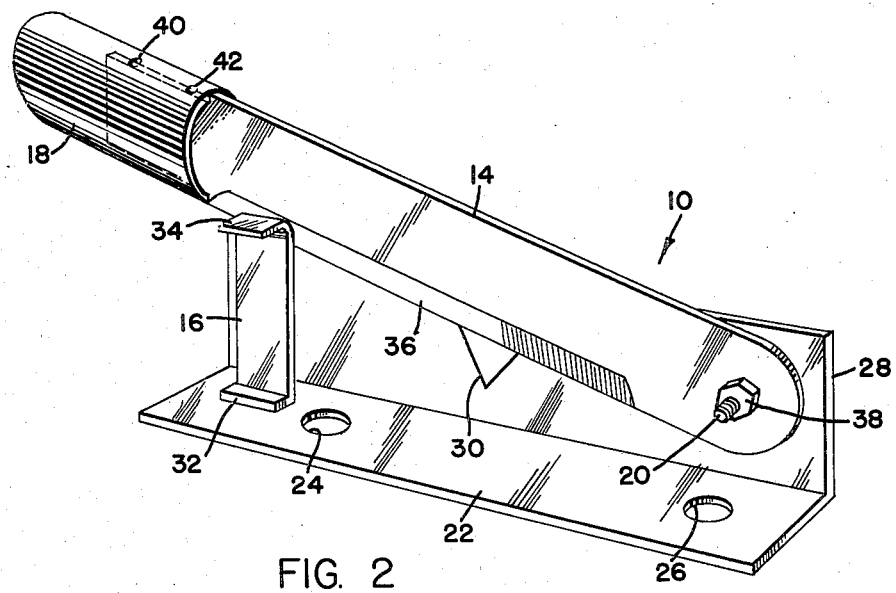
Figure 2 is a view similar to that shown in Figure 1 looking toward the movable blade thereof.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating an angle iron base, numeral 14 a lever or bar providing a blade, numeral 16 a guard mounted on the base and spaced from a vertically disposed flange extended upwardly from one edge of the horizontal web of the base, numeral 18 a tubular handle formed of a piece of pipe, and numeral 20 a bolt for pivotally mounting the lever on the vertically disposed flange.

The angle bar 12 is provided with a horizontally disposed base 22 having bolt holes 24 and 26 therein, and a vertically disposed flange 28 having a V-shaped notch 30 therein. The lower end of the guard 16 is provided with a flange 32 by which the guard is secured to the base 22 by welding or the like, and the upper end of the guard is provided with a guide 34 by which the lever is directed into the space between the guard and vertically disposed flange.

The lever or bar 14 is provided with a beveled cutting edge 36 that is positioned to coact with the V-shaped notch of the flange 28 whereby as the lever is forced downwardly the neck of a chicken or tail of a lamb extended through the notch is severed.

The lever 14 is pivotally mounted on the flange 28 by the bolt 20, which is provided with a lock nut 38, and the bolt is positioned so that the beveled edge 36 slides across the edge of the notch 30. The handle 18, which is positioned on the extended end of the lever is formed of a piece of pipe, and the pipe is formed in an oval or elliptical-shape to correspond with the end of the lever. With the pipe or tube forced on the end of the lever it will remain in place indefinitely, and need not be removed when the cutting edge is sharpened, or when the decapitator is cleaned.

The decapitator assembly includes very few parts and the parts are of conventional structural shapes so that the device is inexpensive to manufacture. For the same reason the device is readily cleaned, sharpened, and repaired.

The tubular or pipe handle 18 may also be secured to the lever 14 by spot welding at the top and bottom, as shown at the points 40 and 42.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts such as come within the purview of the invention claimed may be resorted to in actual practice, if desired.

Having now described the invention that which is claimed to be new and desired to be procured by Letters Patent, is:

1. In a decapitator and tail cutter, the combination which comprises an L-shaped angle iron having a horizontally positioned base and a vertically disposed flange extended upwardly from one edge of the base, said flange having a V-shaped notch with beveled edges at the sides extended downwardly from the upper edge and positioned with the vertex at the bottom whereby necks of fowl or tails of animals may readily be dropped into the notch, an elongated bar having a beveled cutting edge positioned to slide against one surface of the flange, a bolt extended through one end of the bar and also through the flange for pivotally mounting the bar on the flange, the sharp portion of the beveled edge of the bar being positioned to coact with the sharp edges at the sides of the notch to provide a shearing action, a tubular handle, elliptical shape in cross section formed on the end of the bar opposite to the end pivotally mounted on the flange for actuating the decapitator, and a vertically disposed bar having an outwardly extended upper end extended upwardly from the base and spaced from the flange a distance equal to the thickness of the pivotally mounted bar providing a guard for retaining said pivotally mounted bar in shearing relation with the beveled edges at the sides of the notch of the flange.

2. In a decapitator and tail cutter, the combination which comprises an L-shaped angle iron having a horizontally positioned base and a vertically disposed flange extending upwardly from one edge of the base, said flange having a notch extending downwardly from the upper edge of the flange said notch having a beveled edge at the sides thereof whereby necks of fowl or tails of animals may be readily placed into the notch, an elongated cutting means having a beveled lower cutting edge positioned to slide against one surface of said flange, means for retaining one end of said cutting means from moving upwardly away from said flange and for permitting said cutting means to pivot about said one end, and a vertically disposed bar having a flat surface spaced from said flange a distance equal to the thickness of the cutting means whereby a guard is provided for retaining the cutting means in close relation with the beveled edge at the sides of the notch of the flange, said vertically disposed bar being fixed to said base and being of a size for maintaining a position only on one side of said notch for obtaining an economy of construction.

References Cited in the file of this patent

UNITED STATES PATENTS

| | | |
|---|---|---|
| 670,479 | Higgins | Mar. 26, 1901 |
| 1,783,699 | Butcher | Dec. 2, 1930 |
| 2,254,188 | Poppenga | Aug. 26, 1941 |
| 2,787,807 | Anderson et al. | Apr. 9, 1957 |